United States Patent
Ohtsuka et al.

(10) Patent No.: US 12,471,767 B2
(45) Date of Patent: Nov. 18, 2025

(54) CAPSULE ENDOSCOPY SYSTEM

(71) Applicant: MU Ltd., Kusatsu (JP)

(72) Inventors: Naotake Ohtsuka, Kusatsu (JP);
Yasunori Shindo, Kusatsu (JP);
Yoshitake Otsuka, Kusatsu (JP)

(73) Assignee: MU Ltd., Shiga (JP)

( * ) Notice: Subject to any disclaimer, the term of this patent is extended or adjusted under 35 U.S.C. 154(b) by 396 days.

(21) Appl. No.: 18/019,838

(22) PCT Filed: Aug. 2, 2021

(86) PCT No.: PCT/JP2021/028653
§ 371 (c)(1),
(2) Date: Feb. 6, 2023

(87) PCT Pub. No.: WO2022/030458
PCT Pub. Date: Feb. 10, 2022

(65) Prior Publication Data
US 2023/0309805 A1 Oct. 5, 2023

(30) Foreign Application Priority Data
Aug. 7, 2020 (JP) .................. 2020-134541

(51) Int. Cl.
*A61B 1/04* (2006.01)
*A61B 1/00* (2006.01)
*A61B 5/06* (2006.01)

(52) U.S. Cl.
CPC .......... *A61B 1/041* (2013.01); *A61B 1/00158* (2013.01); *A61B 5/062* (2013.01)

(58) Field of Classification Search
CPC ............................ A31B 1/00158; A31B 1/041
See application file for complete search history.

(56) References Cited

U.S. PATENT DOCUMENTS 5,681,260 A * 10/1997 Ueda .................. A61B 1/00082
600/117
2007/0185398 A1 8/2007 Kimura et al.
(Continued)

FOREIGN PATENT DOCUMENTS

| JP | 2006-192252 A | 7/2006 |
|---|---|---|
| JP | 2008-036306 A | 2/2008 |

(Continued)

OTHER PUBLICATIONS

International Search Report for corresponding Application No. PCT/JP2021/028653, mailed Dec. 21, 2021.

*Primary Examiner* — Aaron B Fairchild
(74) *Attorney, Agent, or Firm* — Renner, Otto, Boisselle & Sklar, LLP (57) ABSTRACT

Provided is a capsule endoscopy system that is easy to operate and enables rapid examination. A capsule endoscopy system according to the present invention is a capsule endoscopy system including: a capsule endoscope including a permanent magnet; and an external magnetic field generation device that drives the capsule endoscope, in which the external magnetic field generation device includes three sets of electromagnets provided at positions facing each other in three orthogonal axes, and each of the sets of electromagnets can cause different arbitrary currents to flow in the electromagnets facing each other.

20 Claims, 6 Drawing Sheets (56) References Cited

U.S. PATENT DOCUMENTS

| | | | |
|---|---|---|---|
| 2008/0139883 A1* | 6/2008 | Uchiyama | A61B 1/041 600/117 |
| 2009/0318762 A1 | 12/2009 | Segawa et al. | |
| 2014/0187862 A1 | 7/2014 | Nishihara et al. | |
| 2016/0175063 A1* | 6/2016 | Hason | A61B 1/00158 128/898 |
| 2018/0008131 A1* | 1/2018 | Kawano | A61B 1/00147 |
| 2019/0247669 A1 | 8/2019 | Nielsen et al. | |

FOREIGN PATENT DOCUMENTS

| | | |
|---|---|---|
| JP | 2013066694 A | 4/2013 |
| JP | 5199020 B2 | 5/2013 |
| JP | 2020028427 A | 2/2020 |

* cited by examiner

CAPSULE ENDOSCOPY SYSTEM

TECHNICAL FIELD

The present invention relates to a system for driving a capsule-shaped body in which a permanent magnet is included, and more particularly to a system including a capsule endoscope having a permanent magnet and an external magnetic field generation device for driving the same.

BACKGROUND ART

A capsule endoscopy system that is orally administered into a body and can obtain information in the body has been put into practical use.

The capsule endoscope includes an illumination device and an imaging device for imaging the inside of the body, a wireless transmission device for transmitting a captured image, and the like. As a method of driving the capsule endoscope, a method using a magnetic field is widely known.

For example, there has been proposed a device including a magnetic field application unit for applying a magnetic field under optimum conditions to a capsule endoscope inside a subject under test to perform magnetic induction with high accuracy, an information acquisition unit that acquires physical information regarding magnetic induction of the capsule endoscope, and a control unit that sets magnetic field conditions on the basis of the physical information acquired by the information acquisition unit and controls the magnetic field application unit to apply a magnetic field corresponding to the set magnetic field conditions to the capsule endoscope, thereby controlling the magnetic induction of the capsule endoscope (for example, Patent Document 1).

PRIOR ART DOCUMENT

Patent Document

Patent Document 1: JP 5199020 B2

SUMMARY OF THE INVENTION

Problems to be Solved by the Invention

The device described in Patent Document 1 is capable of inducing the capsule endoscope with high accuracy by setting the magnetic field conditions on the basis of the physical information acquired by the information acquisition unit that acquires the physical information regarding the magnetic induction of the capsule endoscope.

However, there is no specific disclosure of the magnetic field application unit that is a magnetic field generating source for inducing the capsule endoscope, and thus it is unclear whether the capsule endoscope can be moved efficiently or whether good operability can be obtained.

It is very important that a medical device can be easily used by a doctor, and it is desired that there is no risk of erroneous operation even if the doctor is not skilled in operation.

The present invention has been made to solve the above problems, and provides a capsule endoscopy system that has high operability and enables high-speed movement of a capsule endoscope.

Means for Solving the Problems

A capsule endoscopy system of the present invention is a capsule endoscopy system including: a capsule endoscope having a permanent magnet; and an external magnetic field generation device that drives the capsule endoscope, in which the external magnetic field generation device includes three sets of electromagnets provided at positions facing each other in three orthogonal axes, and each of the sets of electromagnets can cause different arbitrary currents to flow in the electromagnets facing each other.

Effect of the Invention

It is very important that a medical device can be easily used by a doctor, and it is desired that there is no risk of erroneous operation even if the doctor is not skilled in operation. That is, it is necessary to easily move the capsule endoscope. For this purpose, it is important for the capsule endoscope to intuitively move without discomfort, and in the present invention, it is ensured that the capsule endoscope moves naturally by devising a magnetic field application device.

Furthermore, in order to reduce the burden on a patient (subject under test), it is also important to complete the examination quickly. In the present invention, the capsule endoscope can move quickly even in a liquid having a large resistance, and the examination time can be shortened.

BRIEF DESCRIPTION OF THE DRAWINGS

FIG. 1(*a*) is a schematic top view and FIG. 1(*b*) is a schematic side view of a capsule endoscope of the present invention.

FIG. 2(*a*) is a schematic top view and FIG. 2(*b*) is a schematic side view of a capsule endoscope of another configuration of the present invention.

FIG. 3(*a*) is a schematic top view and FIG. 3(*b*) is a schematic side view of a capsule endoscope of still another configuration of the present invention.

FIG. 4(*a*) is a schematic top view and FIG. 4(*b*) is a schematic side view of a magnetic field application device of a capsule endoscopy system of the present invention.

FIGS. 5(*a*)-5(*c*) are diagrams for explaining a generated magnetic field of the magnetic field application device of the capsule endoscopy system of the present invention, in which FIG. 5(*a*) is a magnet layout diagram, FIG. 5(*b*) is the generated magnetic field, and FIG. 5(*c*) is differential coefficients of the respective generated magnetic fields.

FIGS. 7(*a*) and 7(*b*) illustrate a configuration example of an external magnetic field generation device of a capsule endoscopy system according to a second embodiment of the present invention.

MODE FOR CARRYING OUT THE INVENTION

First Embodiment

A capsule endoscopy system according to the present invention operates a capsule endoscope in a body, for example, in a stomach or an intestine, by a magnetic field applied from the outside.

First, a configuration of the capsule endoscopy system will be described with reference to FIGS. 1 and 2.

<Configuration of Capsule Endoscopy System>

The capsule endoscopy system of the present invention includes a capsule endoscope 1 having a permanent magnet 3, and an external magnetic field generation device 10 for driving the capsule endoscope 1. The external magnetic field generation device 10 includes three sets of electromagnets 11, 12, 21, 22, 31, and 32 provided at positions facing each other in three orthogonal axes, and can cause different arbitrary currents to flow in the electromagnets 11 and 12 facing each other in an X-axis direction. The same applies to the electromagnets 21 and 22 facing each other in a Y-axis direction and the electromagnets 31 and 32 facing each other in a Z-axis direction.

<Configuration of Capsule Endoscope>

Figure 1A:
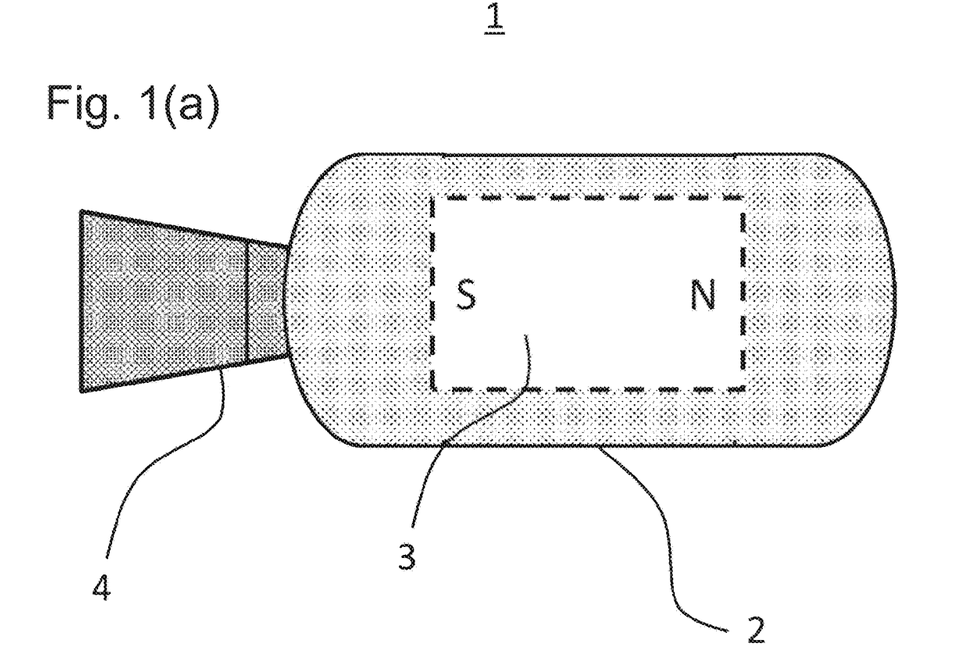
Figure 1B:
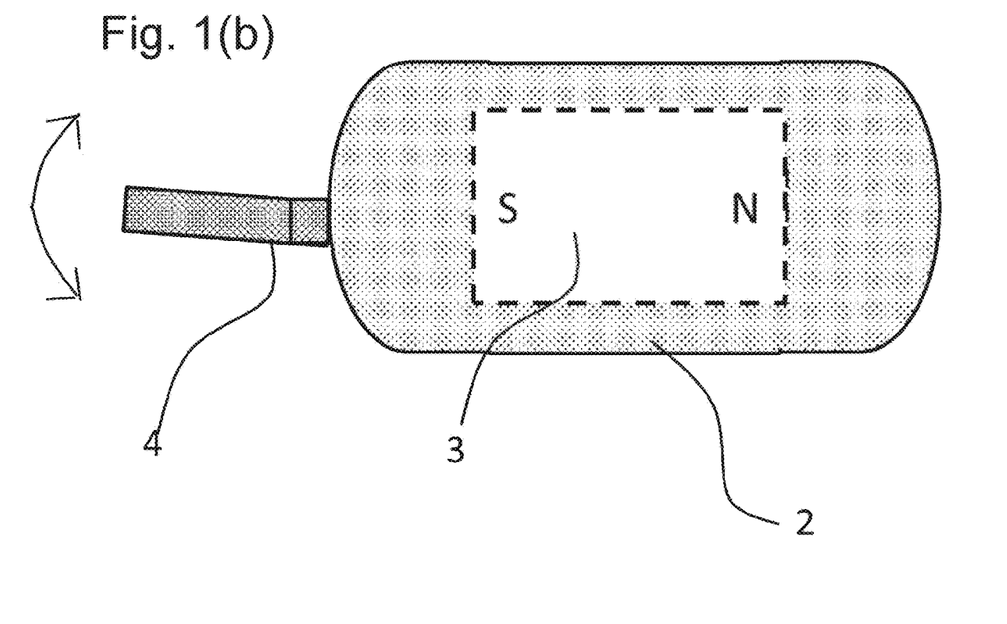

FIG. 1(a) is a schematic top view and FIG. 1(b) is a schematic side view of the capsule endoscope 1 of the present invention. The permanent magnet 3 having magnetic poles in a longitudinal direction thereof is provided in a capsule-shaped housing 2. A size of the housing 2 is a size that can be taken into the body orally, and the housing 2 is made of a material that does not adversely affect the human body and is not dissolved by gastric fluid or the like.

Figures 2A, 2B:
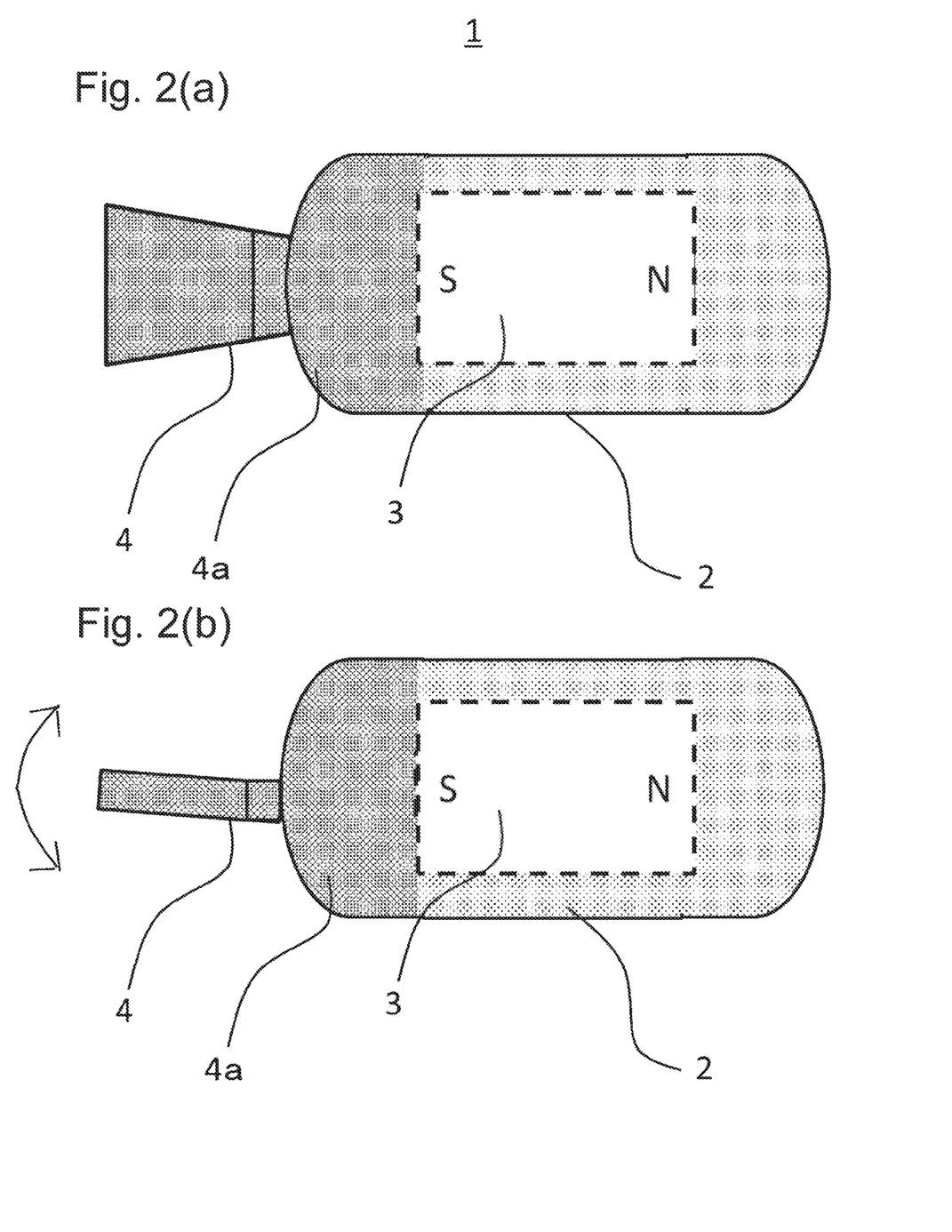

The permanent magnet 3 may be one magnet as illustrated in FIGS. 1 and 2 or a plurality of magnets divided in a magnetization direction. By dividing in the magnetization direction, a distance between the magnetic poles can be increased, and the magnetic moment can be increased.

Similarly to the conventional capsule endoscope, the capsule endoscope has a transmission function of a wireless transmitter or the like capable of capturing an image of a gastric wall or the like and transmitting the captured image data to the outside. That is, an illumination such as an LED, an imaging device such as a CCD, a transmission unit, and a power supply such as a battery for driving them are provided. Note that these are not essential elements of the present invention, and thus are not illustrated in FIG. 1.

Furthermore, in order to improve a driving force, a fin 4 may be provided at one end in the longitudinal direction of the capsule. As indicated by an arrow in FIG. 1(b), the fin 4 has a rotation axis orthogonal to the longitudinal direction of the capsule endoscope 1, and reciprocates and rotates as indicated by the arrow.

The fin 4 may be fixed to the housing 2 by adhesion, fitting, or the like.

Alternatively, as illustrated in FIG. 2, a rubber 4a or the like that wraps the fin 4 and a part of the housing 2 may be integrated and attached so as to cover a capsule body. For example, a cylindrical rubber provided with the fins 4 may be fitted into the housing 2.

Moreover, it is desirable that a specific gravity of the entire capsule endoscope 1 is substantially the same as a specific gravity of a fluid of a portion under examination. This is because if the specific gravity of the entire capsule endoscope is substantially the same as the specific gravity of the fluid of the portion under examination, buoyancy hardly works, and thus the capsule endoscope 1 can be moved in an arbitrary direction with substantially the same force.

Figures 3A, 3B:
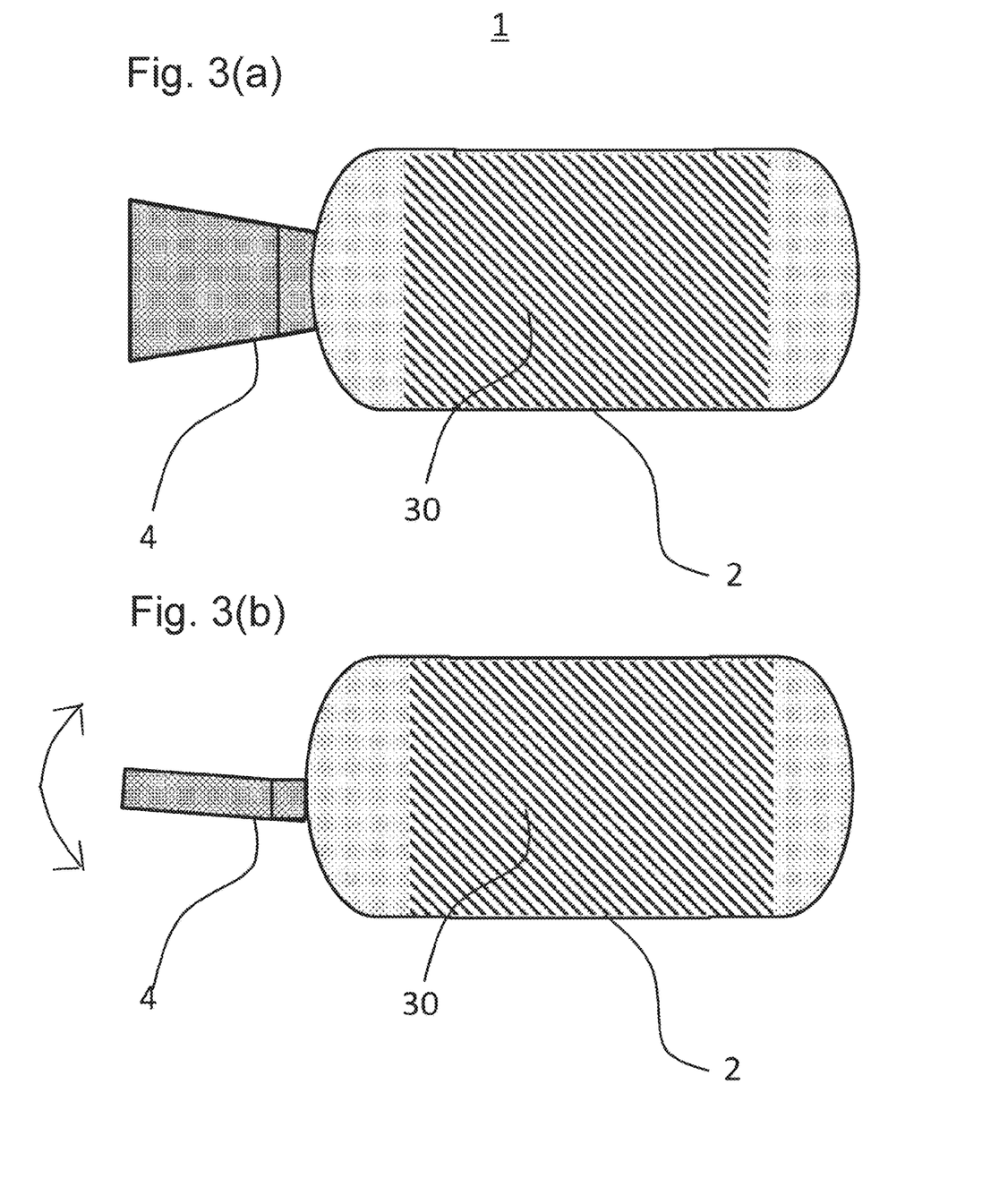

Note that without using the permanent magnet 3, magnetic powder having magnetic poles in the longitudinal direction of the housing 2 may be mixed with the constituent material of the fin 4, or the fin 4 may be constituted by a magnet. Alternatively, as illustrated in FIG. 3, the housing 2 may be covered with a cover 30 made of rubber or the like containing magnetic powder having magnetic poles in the longitudinal direction of the housing 2 without using the permanent magnet 3, or the cover 30 may be constituted by a magnet. For example, the fin 4 and the cover 30 are produced by mixing magnet powder of a rare earth magnet with an elastomer resin or the like and molding the mixture, and by using the fin 4 and the cover, a permanent magnet such as a rod magnet can be made unnecessary.

By using a material such as rubber containing magnetic powder in this manner, it is not necessary to use a permanent magnet such as a bar magnet, and the capsule endoscope can be reduced in weight and size. It is also easy to make the specific gravity substantially the same as the specific gravity of the fluid of the portion under examination. Furthermore, a magnet is not provided in an endoscope capsule for the small intestine or the large intestine which is conventionally used. It is also possible to change such an endoscope capsule into an endoscope capsule for examination of the stomach and intestine. Alternatively, any type of capsule endoscope in which no magnet is provided in the capsule can be easily made into a capsule endoscope in which a magnet is provided.

<Configuration of Electromagnet>

Figure 4A:
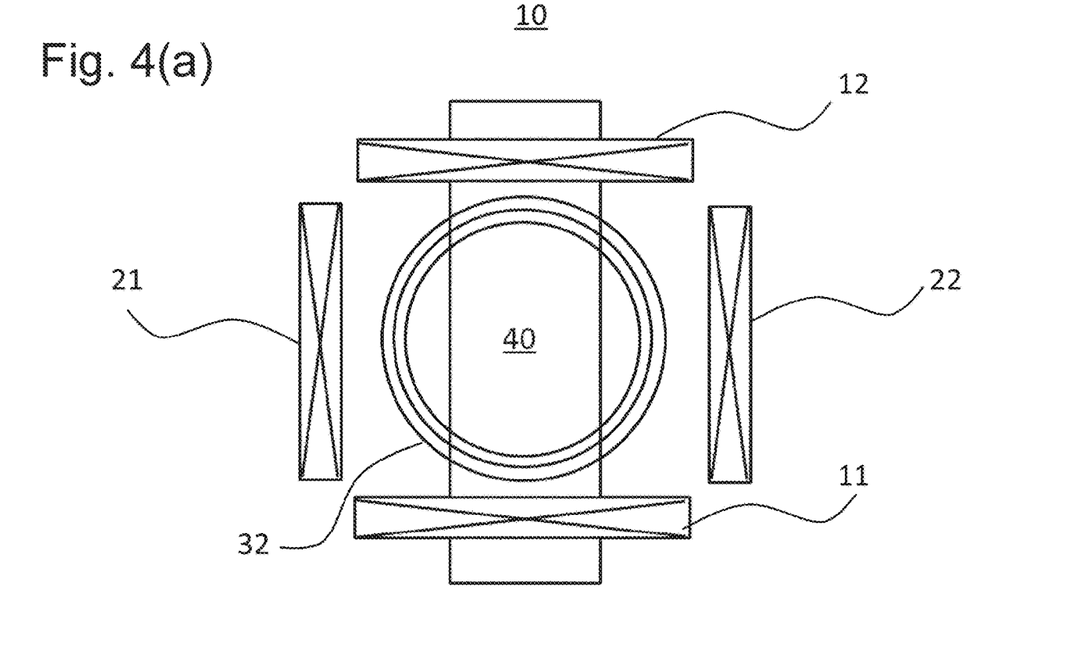
Figure 4B:
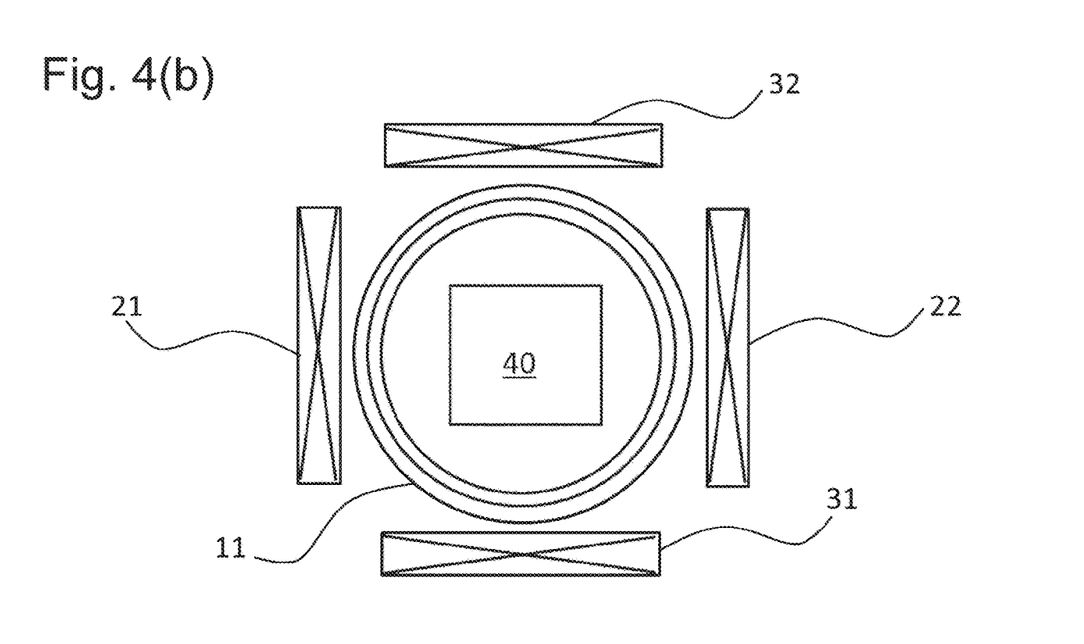

FIG. 4(a) is a schematic top view and FIG. 4(b) is a schematic side view of a magnetic field application device of the capsule endoscopy system of the present invention. A test subject space 40 is provided in the center, and in the test subject space 40, for example, a bed on which the test subject can lie is disposed. Three sets of electromagnets 11, 12, 21, 22, 31, and 32 provided at positions facing each other in three orthogonal axes are disposed so as to surround the test subject space 40. One set of X-direction electromagnets 11 and 12 facing each other for applying a magnetic field in one horizontal direction, one set of Y-direction electromagnets 21 and 22 facing each other for applying a magnetic field in a horizontal direction substantially orthogonal thereto, and one set of Z-direction electromagnets 31 and 32 facing each other for applying a magnetic field in a vertical direction are provided.

Each of the electromagnets 11, 12, 21, 22, 31, and 32 is, for example, a Helmholtz coil, and may be an air-core coil or a coil having a magnetic core such as iron. Furthermore, in order to prevent overheating, a cooling fan may be provided, or water cooling may be performed.

A power supply device (not illustrated) is independently connected to each of the six electromagnets 11, 12, 21, 22, 31, and 32, and a current of an arbitrary magnitude can independently flow through each of the electromagnets 11, 12, 21, 22, 31, and 32.

Furthermore, a controller (not illustrated) for controlling the six power supply devices is provided, and can control the current flowing through the six electromagnets 11, 12, 21, 22, 31, and 32.

In a normal electromagnetic device, currents of the same magnitude are caused to flow in the same direction in one set of electromagnets facing each other, but in the present invention, different arbitrary currents can be caused to flow in the X-direction electromagnets 11 and 12 facing each other. The same applies to the Y-direction electromagnets 21 and 22 facing each other and the Z-direction electromagnets 31 and 32 facing each other.

<Operation of Capsule Endoscopy System>

Next, an operation of the capsule endoscopy system will be described.

As described above, it is possible to cause different arbitrary currents to flow in the respective electromagnets facing each other. Advantages of this configuration will be described.

Figures 5A, 5B, 5C:
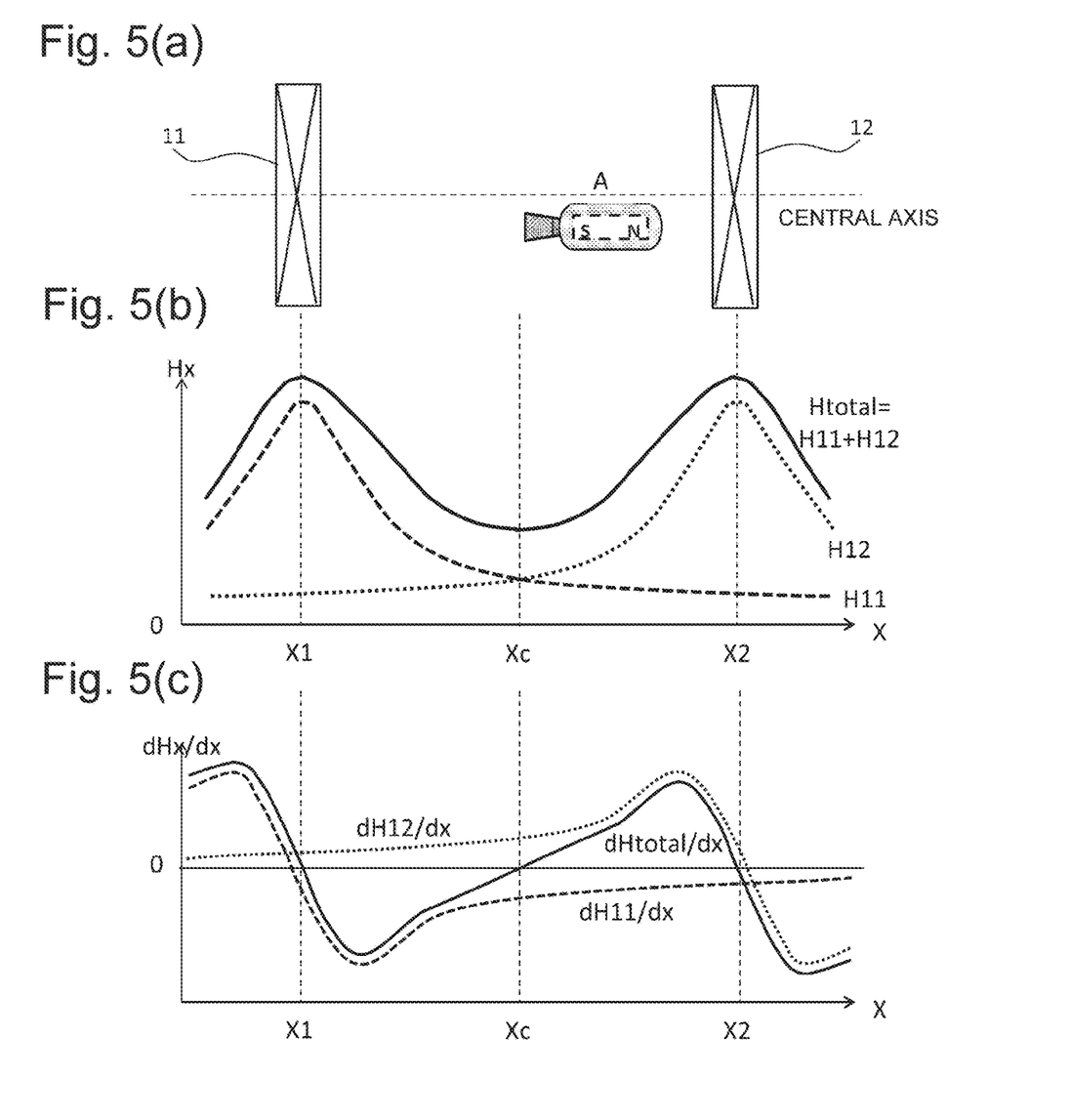

FIG. 5 is a diagram for explaining a generated magnetic field of the magnetic field application device of the capsule endoscopy system of the present invention, in which FIG. 5(a) is a magnet layout diagram of the X-direction electromagnets 11 and 12 facing each other, and FIG. 5(b) is the generated magnetic field. The generated magnetic field indicates a magnetic field H11 generated by the X-direction electromagnet 11, a magnetic field H12 generated by the X-direction electromagnet 12, and a combined magnetic field Htotal=H11+H12 of the magnetic field H11 and the magnetic field H12. Each generated magnetic field is a magnetic field on a central axis of the X-direction electromagnet 11 and the X-direction electromagnet 12.

Furthermore, FIG. 5(c) is differential coefficients in the X direction of the respective generated magnetic fields.

In FIG. 5(a), a direction in which the magnetic lines of force are rightward is defined as a positive direction.

When the generated magnetic field is positive, the N-pole of the permanent magnet of the capsule endoscope faces a right direction in the drawing, and when the generated magnetic field is negative, the N-pole of the permanent magnet of the capsule endoscope faces a left direction in the drawing. Then, in a case where a differential coefficient of the generated magnetic field in the X direction is positive, the capsule endoscope proceeds to the right when the N-pole of the permanent magnet faces the right, and proceeds to the left when the N-pole of the permanent magnet faces the left. Furthermore, in a case where a differential coefficient of the generated magnetic field in the X direction is negative, the capsule endoscope proceeds to the left (backward) when the N-pole of the permanent magnet faces the right, and proceeds to the right (backward) when the N-pole of the permanent magnet faces the left. As a result, a traveling direction of the capsule endoscope is as follows.

TABLE 1

|  | Hx > 0 | Hx < 0 |
| --- | --- | --- |
| dHx/dx > 0 | Forward right | Forward left |
| dHx/dx < 0 | Backward right | Backward left |

The combined magnetic field Htotal=H11+H12 illustrated in FIG. 5(b) is a generated magnetic field when currents of the same magnitude are caused to flow in the X-direction electromagnet 11 and the X-direction electromagnet 12 in the same direction, and is positive in all places from a position X1 of the X-direction electromagnet 11 to a position X2 of the X-direction electromagnet 12.

A differential coefficient in the X direction of the combined magnetic field Htotal illustrated in FIG. 5(c) becomes 0 in the vicinity of the position X1 of the X-direction electromagnet 11, the vicinity of the position X2 of the X-direction electromagnet 12, and a center Xc thereof. Then, the value becomes negative between the vicinity of X1 and Xc, and becomes positive between the vicinity of Xc and X2. Therefore, when the capsule endoscope is located on the right side of Xc, the capsule endoscope moves rightward (forward right), and when the capsule endoscope is located on the left side, the capsule endoscope moves leftward (backward right). As described above, in a case where currents of the same magnitude are caused to flow through the X-direction electromagnet 11 and the X-direction electromagnet 12 in the same direction, the capsule endoscope cannot move beyond the center Xc.

On the other hand, in the capsule endoscopy system of the present invention, the X-direction electromagnet 11 and the X-direction electromagnet 12 can be independently controlled. For example, it is also possible to cause a current to flow only in the X-direction electromagnet 11 without causing a current to flow in the X-direction electromagnet 12. At this time, only H11 in FIG. 5(b) is applied. Since the generated magnetic field of H11 is positive between X1 and X2 and the differential coefficient thereof in the X direction is negative between X1 and X2, the capsule endoscope 1 at any position between X1 and X2 can proceed in the left direction (backward right) and move beyond the center Xc. Furthermore, when no current is caused to flow in the X-direction electromagnet 11 and a current is caused to flow only in the X-direction electromagnet 12, it is possible to proceed in the right direction (forward right).

In this manner, by independently controlling the current flowing through the two electromagnets facing each other, the position of the capsule endoscope can be moved to a desired position.

Furthermore, in the capsule endoscopy system of the present invention, for example, it is also possible to cause a current to flow in the X-direction electromagnet 12 and at the same time, cause a current to flow in an orthogonal direction, for example, the Z-direction electromagnets 31 and 32. It is also possible to generate an AC magnetic field in the z direction by flowing an AC current of about 10 Hz in the Z-direction electromagnets 31 and 32 alone or simultaneously. Then, the capsule endoscope 1 vibrates in the z direction around the center of gravity position. Capsule endoscopes are often used along an inner wall of an organ to be examined. For example, at the time of examination of the stomach, the capsule endoscope is moved along a wall of the stomach to observe the inside of the stomach. By being along the wall of the stomach, the position of the capsule endoscope is stabilized and observation becomes easy. On the other hand, there is also a disadvantage that it is difficult to move the capsule endoscope due to frictional resistance with the wall of the stomach. However, by vibrating the capsule endoscope 1 in a direction orthogonal to the wall of the stomach, frictional resistance with the wall of the stomach can be greatly reduced, and the capsule endoscope can be moved smoothly and quickly along the wall of the stomach.

Alternatively, even when the capsule endoscope enters between the folds of the stomach wall or the like, it is easy to escape by moving the capsule endoscope while applying an oscillating magnetic field. In this case, a vibrating magnetic field is applied in a direction parallel to the traveling direction, so that it may be easy to escape.

Furthermore, in a case where the fin 4 illustrated in FIG. 1 and the like is provided, it is possible to obtain a larger driving force by vibrating the fin 4.

Note that, as described above, in order to increase the driving force, it is efficient to apply the oscillating magnetic field in a direction orthogonal to a moving direction, but the driving force is improved even if the oscillating magnetic field is applied in an arbitrary direction different from the moving direction without being limited to the orthogonal direction.

Furthermore, by reducing the current flowing through the electromagnets and reducing the driving force applied to the capsule endoscope compared to the liquid resistance against gastric juice or the like, the capsule endoscope can be substantially stopped at a desired position. Then, by causing a current to flow through the electromagnets orthogonal to each other, a combined magnetic field in an arbitrary direction can be formed, and the capsule endoscope can be directed at an arbitrary angle at an arbitrary position.

Summary of the Present Embodiment

The present invention provides a capsule endoscopy system that is easy to operate as a medical device, particularly an examination device, and enables rapid examination. It is also possible to reduce the burden on the subject by reducing the risk of erroneous operation by the doctor and shortening the examination time.

Hereinafter, features of the present invention will be listed.

First, three sets of electromagnets provided at positions facing each other in three orthogonal axes are provided, and in each of the sets of electromagnets, it is possible to cause different arbitrary currents to flow in each of the electromagnets facing each other, so that movement that is difficult to intuitively understand is not generated, and a user can learn an operation in a short time. Since erroneous operation is less likely to occur and the capsule endoscope is easily stopped at a desired position, the examination time can be shortened.

Second, since an oscillating magnetic field can be applied in a direction different from the traveling direction of the capsule endoscope, particularly in a direction substantially orthogonal to the traveling direction, friction with a mucous membrane (organ wall) is reduced, and movement of the capsule endoscope becomes easier. As a result, the capsule endoscope can be moved at a high speed even in a highly viscous fluid. Furthermore, in the case of a narrow flow path such as the small intestine, sufficient driving force can be obtained even while contacting the wall of the small intestine. Therefore, it is possible to obtain great features such as shortening of the examination time and enlargement of the examination possible portion.

Moreover, by providing the fin, a larger driving force can be obtained.

Note that in the case of a capsule endoscope having no driving force, due to peristalsis of the digestive system, the capsule endoscope slowly advances the digestive system path. As in the present invention, even in the case of a capsule endoscope with a driving force, peristalsis of the digestive system increases the driving force. In particular, when an oscillating magnetic field is applied in a direction different from the traveling direction of the capsule endoscope, there is an effect of activating the peristalsis by stimulating an organ wall of the digestive system. This effect becomes remarkable when the capsule endoscope progresses in an organ having a long path such as the small intestine or the large intestine. Vibration in a direction different from the traveling direction of the capsule endoscope strongly stimulates organ walls of the small intestine and the large intestine to activate the peristalsis, thereby accelerating the capsule endoscope. Furthermore, the small intestine is thin and intricately tortuous, and it is difficult to drive the capsule endoscope only with a static magnetic field. This is because it is extremely difficult to control a direction of the static magnetic field in accordance with a winding elongated path. On the other hand, when an oscillating magnetic field is applied to make it a driving force, it becomes a driving force in an advancing direction, so that it is possible to travel along a complex path together with a driving force by the peristalsis.

As described above, by applying an oscillating magnetic field in a direction different from the traveling direction of the capsule endoscope, friction with a mucous membrane (organ wall) is reduced, and the peristalsis is activated. Due to these effects, the passage time can be significantly shortened even in an organ having a narrow, long, and winding path such as the small intestine or the large intestine.

Furthermore, there is a case where the capsule endoscope is caught and stagnates in a narrowed portion of the small intestine or the like and a fold portion of the large intestine. Since reverse running is also possible as shown in Table 1, it is also possible to return in a direction opposite to a peristaltic direction. In particular, when an oscillating magnetic field is applied in a direction different from the traveling direction of the capsule endoscope, it is easier to escape from a retention point by reducing friction. For example, when the capsule endoscope is returned from the small intestine to the duodenum, the capsule endoscope can be collected using the endoscope without performing surgery or the like.

Figure 6:
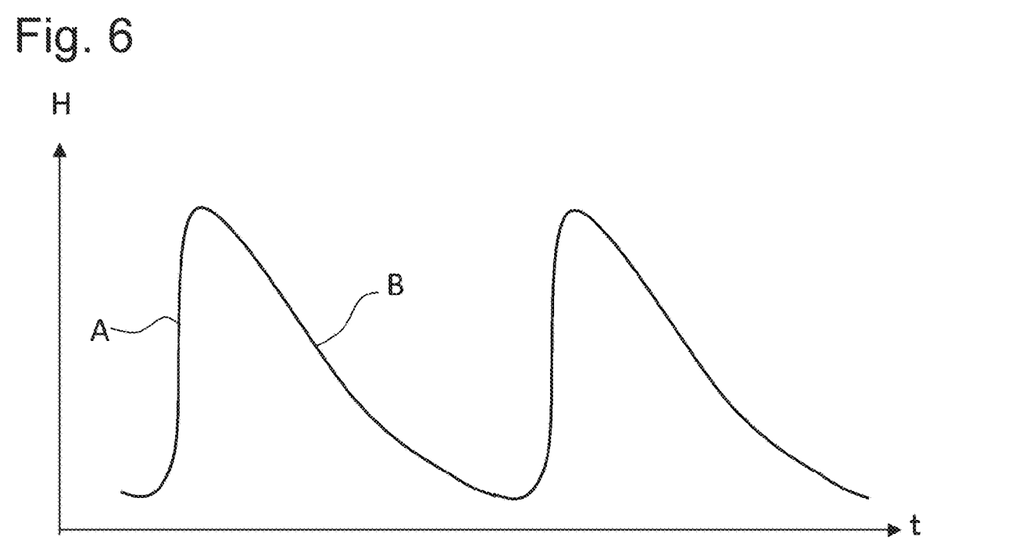
FIG. 6 is a diagram illustrating an example of an applied magnetic field of the capsule endoscopy system of the present invention, and illustrating a magnetic field that changes with time in a sawtooth shape.

For example, it is extremely effective to apply a sawtooth-shaped oscillating magnetic field as illustrated in FIG. 6. By applying the oscillating magnetic field having a waveform of a temporal steep rise (A in FIG. 6) and a waveform of a gradual fall (B in FIG. 6), in a case of staying in a narrow portion such as the small intestine or a fold portion of the large intestine, it is possible to escape with a strong propulsive force. This is because the steep rise of the magnetic field creates a large driving force in a desired direction.

As described above, the capsule endoscope of the present invention can be suitably used also in the stomach, but is particularly suitable for examination of the small intestine and the large intestine.

Third, by making the specific gravity of the capsule endoscope substantially the same as the specific gravity of the fluid of the portion under examination, the capsule endoscope can travel in an arbitrary direction with the same driving force. As a result, a more intuitive and smooth operation becomes possible, and the operability is further improved. For example, when the specific gravity of the capsule endoscope is larger than the specific gravity of the fluid of the portion under examination, the capsule endoscope easily settles down, and the close observation of the organ wall can be performed, but the capsule endoscope hits a bottom wall of the stomach or the like, and hardly moves due to the contact resistance. However, if the specific gravities are substantially the same, such a situation does not occur, and it is possible to travel while floating on a water surface by applying a small ascending propulsion force, and it is possible to stably travel and image. According to an imaging place or the purpose of the user, the imaging can be performed from either the vicinity of the portion under examination or the water surface.

Second Embodiment

In the first embodiment, a unit that generates a current flowing through the three sets of electromagnets provided at positions facing each other in three orthogonal axes of the external magnetic field device is not particularly described. Usually, a signal from the controller is amplified to a large power by an amplifier, and an output from the amplifier causes a large current to flow in each electromagnet. Therefore, one amplifier was required for each of the six electromagnets. However, since the current flowing through the electromagnet is as large as 20 amperes, it is necessary to use as many as six very large and expensive amplifiers.

In the present embodiment, a configuration in which only one amplifier can be used for at least one set of electromagnets among the three sets of electromagnets will be described with reference to FIG. 7.

The external magnetic field generation device includes three sets of electromagnets provided at positions facing each other in three orthogonal axes, a controller 101 for determining a current flowing through each of the three sets of electromagnets, and a plurality of amplifiers for amplifying an output of the controller 101. A characteristic feature of the present embodiment is that at least one set of electromagnets 91 and 92 of the three sets of electromagnets provided at positions facing each other in the three orthogonal axes has a simpler configuration. Specifically, an amplifier 102 is singular and includes a switch 103 for switching which electromagnet 91 or 92 an output current of the amplifier flows to, and from the controller, a signal for determining which electromagnet of the one set of electromagnets the current flows to is output to the switch, and a signal for determining the current flowing to the electromagnet is output to the one amplifier.

The electromagnets 91 and 92 are a set of opposing electromagnets, and may be a set of magnets facing each other on any axis of the X axis, the Y axis, or the Z axis.

Figure 7A:
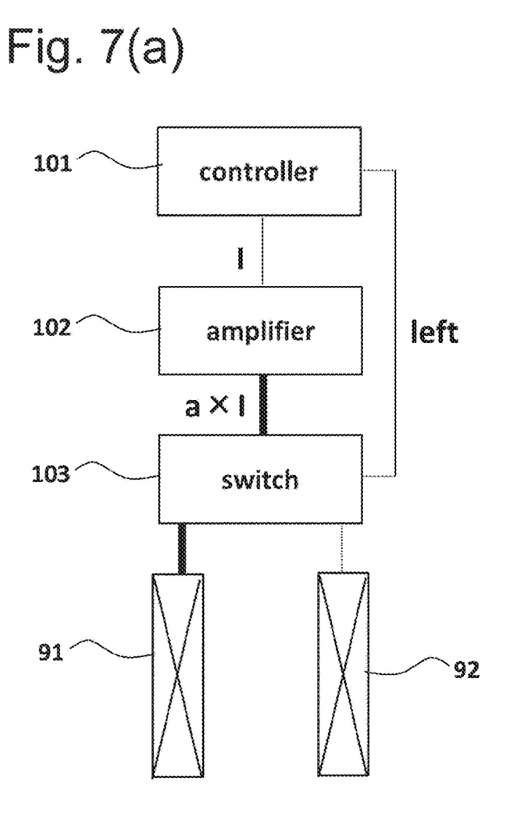

In FIG. 7(a), an output I proportional to the current flowing through the electromagnet is output from the controller 101 to the amplifier 102, and the amplifier 102 outputs the current amplified "a" times to the switch 103. The controller 101 outputs a switching signal designating an output to the electromagnet 91 to the switch 103, and the current aI output from the amplifier 102 is output to the electromagnet 91.

Figure 7B:
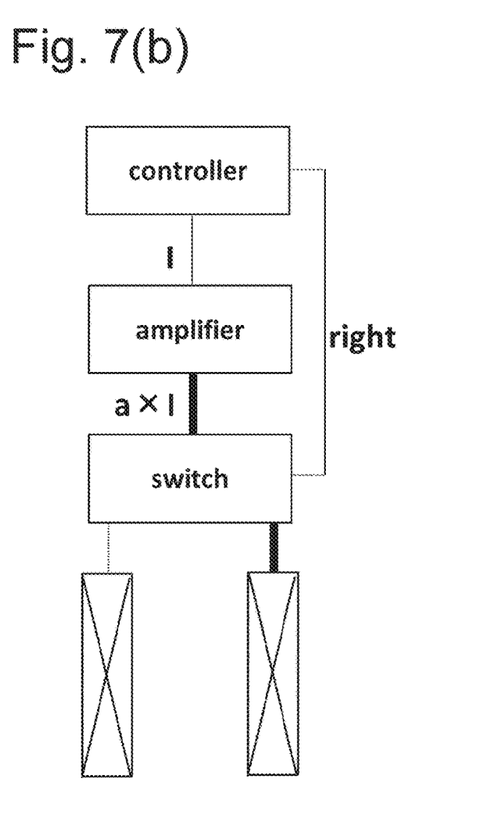

In FIG. 7(b), the controller 101 outputs a switching signal for designating an output to the electromagnet 92 to the switch 103, and the current aI output from the amplifier 102 is output to the electromagnet 92.

In this configuration, the current flowing through one set of electromagnets facing each other becomes zero, but the minimum necessary movement can be performed as the movement of the endoscope.

As described above, since only one amplifier is required, the device can be reduced in size and cost.

DESCRIPTION OF SYMBOLS

1 Capsule endoscope
2 Housing
3 Permanent magnet
4 Fin
10 External magnetic field generation unit
11, 12 X-direction electromagnet
21, 22 Y-direction electromagnet
31, 32 Z-direction electromagnet
40 test Subject space

The invention claimed is:

1. A capsule endoscopy system comprising:
a capsule endoscope having a permanent magnet; and
an external magnetic field generation device that drives the capsule endoscope, wherein
the external magnetic field generation device includes three sets of electromagnets provided at positions facing each other in three orthogonal axes, and
each of the sets of electromagnets can cause different arbitrary currents to flow in the electromagnets facing each other.

2. The capsule endoscopy system according to claim 1, wherein
the permanent magnet comprises a cover containing magnetic powder or a cover including a magnet, the cover being provided so as to cover a housing of the capsule endoscope.

3. The capsule endoscopy system according to claim 2, wherein the external magnetic field generation device includes the three sets of electromagnets, further comprising:
a controller configured to determine a current flowing through each of the three sets of electromagnets; and
an amplifier configured to amplify an output of the controller, wherein the amplifier is provided for at least one set of electromagnets of the three sets of electromagnets provided at positions facing each other in the three orthogonal axes; and
a switching unit configured to switch where to flow an output current of the amplifier,
wherein the controller is configured to:
output a signal for determining the electromagnet of the one set of electromagnets which the output current flows to the switching unit, and
output a signal for determining a current flowing through the electromagnet to the amplifier.

4. The capsule endoscopy system according to claim 1, wherein
the external magnetic field generation device is configured to apply an oscillating magnetic field in a direction different from a traveling direction of the capsule endoscope.

5. The capsule endoscopy system according to claim 4, wherein
the external magnetic field generation device is configured to apply the oscillating magnetic field in a direction substantially orthogonal to the traveling direction of the capsule endoscope.

6. The capsule endoscopy system according to claim 5, wherein the external magnetic field generation device includes the three sets of electromagnets, further comprising:
a controller configured to determine a current flowing through each of the three sets of electromagnets;
an amplifier configured to amplify an output of the controller, wherein the amplifier is provided for at least one set of electromagnets of the three sets of electromagnets provided at positions facing each other in the three orthogonal axes; and
a switching unit configured to switch where to flow an output current of the amplifier,
wherein the controller is configured to:
output a signal for determining the electromagnet of the one set of electromagnets which the output current of the amplifier flows to the switching unit, and
output a signal for determining a current flowing through the electromagnet to the amplifier.

7. The capsule endoscopy system according to claim 4, wherein
the oscillating magnetic field is a sawtooth-shaped oscillating magnetic field.

8. The capsule endoscopy system according to claim 4, wherein the external magnetic field generation device includes the three sets of electromagnets, further comprising:
a controller configured to determine a current flowing through each of the three sets of electromagnets;
an amplifier configured to amplify an output of the controller, wherein the amplifier is provided for at least one set of electromagnets of the three sets of electromagnets provided at positions facing each other in the three orthogonal axes; and
a switching unit configured to switch where to flow an output current of the amplifier, wherein the controller is configured to:
output a signal for determining the electromagnet of the one set of electromagnets which the output current of the amplifier flows to the switching unit, and
output a signal for determining a current flowing through the electromagnet to the amplifier.

9. The capsule endoscopy system according to claim 4, wherein
the capsule endoscope is configured for examination of small intestine and/or large intestine.

10. The capsule endoscopy system according to claim 9, wherein the external magnetic field generation device includes the three sets of electromagnets, further comprising:
a controller configured to determine a current flowing through each of the three sets of electromagnets;
an amplifier configured to amplify an output of the controller, wherein the amplifier is provided for at least one set of electromagnets of the three sets of electromagnets provided at positions facing each other in the three orthogonal axes; and
a switching unit configured to switch where to flow an output current of the amplifier,
wherein the controller is configured to:
output a signal for determining the electromagnet of the one set of electromagnets which the output current of the amplifier flows to the switching unit, and
output a signal for determining a current flowing through the electromagnet to the amplifier.

11. The capsule endoscopy system according to claim 4, further comprising a fin including a rotation axis orthogonal to a longitudinal direction of the capsule endoscope.

12. The capsule endoscopy system according to claim 11, wherein
the permanent magnet comprises the fin with a material containing magnetic powder or the fin with a magnet.

13. The capsule endoscopy system according to claim 12, wherein the external magnetic field generation device includes the three sets of electromagnets, further comprising:
a controller configured to determine a current flowing through each of the three sets of electromagnets;
an amplifier configured to amplify an output of the controller, wherein the amplifier is provided for at least one set of electromagnets of the three sets of electromagnets provided at positions facing each other in the three orthogonal axes; and
a switching unit configured to switch where to flow an output current of the amplifier,
wherein the controller is configured to:
output a signal for determining the electromagnet of the one set of electromagnets which the output current of the amplifier flows to the switching unit, and
output a signal for determining a current flowing through the electromagnet to the amplifier.

14. The capsule endoscopy system according to claim 11, wherein the external magnetic field generation device includes the three sets of electromagnets, further comprising:
a controller configured to determine a current flowing through each of the three sets of electromagnets;
an amplifier configured to amplify an output of the controller, wherein the amplifier is provided for at least one set of electromagnets of the three sets of electromagnets provided at positions facing each other in the three orthogonal axes; and
a switching unit configured to switch where to flow an output current of the amplifier,
wherein the controller is configured to:
output a signal for determining the electromagnet of the one set of electromagnets which the output current of the amplifier flows to the switching unit, and
output a signal for determining a current flowing through the electromagnet to the amplifier.

15. The capsule endoscopy system according to claim 4, wherein the external magnetic field generation device includes the three sets of electromagnets, further comprising:
a controller configured to determine a current flowing through each of the three sets of electromagnets;
an amplifier configured to amplify an output of the controller, wherein the amplifier is provided for at least one set of electromagnets of the three sets of electromagnets provided at positions facing each other in the three orthogonal axes; and
a switching unit configured to switch where to flow an output current of the amplifier,
wherein the controller is configured to:
output a signal for determining the electromagnet of the one set of electromagnets which the output current of the amplifier flows to the switching unit, and
output a signal for determining a current flowing through the electromagnet to the amplifier.

16. The capsule endoscopy system according to claim 1, wherein
a specific gravity of the capsule endoscope is substantially identical with a specific gravity of a fluid of a portion under examination.

17. The capsule endoscopy system according to claim 16, wherein the external magnetic field generation device includes the three sets of electromagnets, further comprising:
a controller configured to determine a current flowing through each of the three sets of electromagnets;
an amplifier configured to amplify an output of the controller, wherein the amplifier is provided for at least one set of electromagnets of the three sets of electromagnets provided at positions facing each other in the three orthogonal axes; and
a switching unit configured to switch where to flow an output current of the amplifier,
wherein the controller is configured to:
output a signal for determining the electromagnet of the one set of electromagnets which the output current of the amplifier flows to the switching unit, and
output a signal for determining a current flowing through the electromagnet to the amplifier.

18. The capsule endoscopy system according to claim 1, wherein
the permanent magnet includes a plurality of permanent magnets divided in a magnetization direction.

19. The capsule endoscopy system according to claim 18, wherein the external magnetic field generation device includes the three sets of electromagnets, further comprising:
a controller configured to determine a current flowing through each of the three sets of electromagnets;
an amplifier configured to amplify an output of the controller, wherein the amplifier is provided for at least one set of electromagnets of the three sets of electromagnets provided at positions facing each other in the three orthogonal axes; and a switching unit configured to switch where to flow an output current of the amplifier, wherein the controller is configured to:
output a signal for determining the electromagnet of the one set of electromagnets which the output current of the amplifier flows to the switching unit, and
output a signal for determining a current flowing through the electromagnet to the amplifier.

20. The capsule endoscopy system according to claim 1, wherein the external magnetic field generation device includes the three sets of electromagnets, further comprising:

a controller configured to determine a current flowing through each of the three sets of electromagnets; and an amplifier configured to amplify an output of the controller, wherein the amplifier is provided for at least one set of electromagnets of the three sets of electromagnets provided at positions facing each other in the three orthogonal axes; and a switching unit configured to switch where to flow an output current of the amplifier, wherein the controller is configured to:
output a signal for determining the electromagnet of the one set of electromagnets which the output current flows to the switching unit, and
output a signal for determining a current flowing through the electromagnet to the amplifier.

\* \* \* \* \*